(12) United States Patent
Noonan (10) Patent No.: US 8,886,394 B2
(45) Date of Patent: Nov. 11, 2014

(54) PRODUCING DATA DESCRIBING STATES OF A PLURALITY OF TARGETS

(75) Inventor: Colin Anthony Noonan, Preston (GB)

(73) Assignee: BAE Systems PLC, London (GB)

( * ) Notice: Subject to any disclaimer, the term of this patent is extended or adjusted under 35 U.S.C. 154(b) by 0 days.

(21) Appl. No.: 13/516,893

(22) PCT Filed: Dec. 17, 2010

(86) PCT No.: PCT/GB2010/052139
§ 371 (c)(1),
(2), (4) Date: Jun. 18, 2012

(87) PCT Pub. No.: WO2011/073683
PCT Pub. Date: Jun. 23, 2011

(65) Prior Publication Data
US 2012/0277948 A1    Nov. 1, 2012

(30) Foreign Application Priority Data

Dec. 17, 2009  (EP) ................................. 09252822
Dec. 17, 2009  (GB) ................................. 0922011.2

(51) Int. Cl.
*G01S 13/72* (2006.01)
*G01S 7/00* (2006.01)
*G01S 13/87* (2006.01)

(52) U.S. Cl.
CPC .............. *G01S 7/003* (2013.01); *G01S 13/726* (2013.01); *G01S 13/87* (2013.01)
USPC .......... 701/30.3; 701/23; 701/30.4; 701/30.5; 701/30.6; 701/30.7; 701/30.8; 701/31.1; 701/479; 701/498; 701/501; 701/509; 701/514; 701/535; 702/32; 702/143

(58) Field of Classification Search
CPC ........... G06K 9/62; G01S 13/87; G01S 13/72; G01S 7/00; G01S 5/0294; G06F 11/3075; G06F 11/3079; G06F 11/3082
USPC .......... 701/30.3, 30.4, 30.5, 30.6, 30.7, 30.8, 701/31.1, 479, 498, 501, 509, 514, 535; 702/32, 143; 382/155–161, 215–216, 382/224–225, 228; 342/44

See application file for complete search history.

(56) References Cited

U.S. PATENT DOCUMENTS 5,798,942 A *  8/1998  Danchick et al. ............... 342/96
6,459,990 B1 * 10/2002  McCall et al. ................. 701/501

(Continued)

FOREIGN PATENT DOCUMENTS

| DE | 19701387 C2 | 7/1998 |
| WO | WO 03/001474 A2 | 1/2003 |
| WO | WO 2007/144570 A1 | 12/2007 |

OTHER PUBLICATIONS

International Search Report (PCT/ISA/210) issued on Mar. 15, 2011, by the European Patent Office as the International Searching Authority for International Application No. PCT/GB2010/052139.

(Continued)

*Primary Examiner* — Mary Cheung
*Assistant Examiner* — Atul Trivedi
(74) *Attorney, Agent, or Firm* — Maine Cernota & Rardin (57) ABSTRACT

Methods and systems for producing data describing states of a plurality of targets using a processor in a system having at least one onboard sensor. The method includes obtaining data from at least one onboard sensor and performing a first data fusion process on the obtained onboard sensor data to produce onboard sensor fused data. Data is also obtained from at least one off-board sensor, and a second, different data fusion process is performed on the obtained off-board sensor data and the onboard sensor fused data to produce target state data.

20 Claims, 3 Drawing Sheets

(56) References Cited

U.S. PATENT DOCUMENTS

| | | | |
|---|---|---|---|
| 7,421,090 B2* | 9/2008 | Muise et al. | 382/103 |
| 7,477,994 B2* | 1/2009 | Sunshine et al. | 702/32 |
| 8,089,393 B2* | 1/2012 | Nettleton et al. | 342/59 |
| 8,306,747 B1* | 11/2012 | Gagarin et al. | 701/514 |
| 8,594,927 B2* | 11/2013 | Louis et al. | 701/445 |
| 2003/0204382 A1* | 10/2003 | Julier et al. | 702/196 |
| 2004/0047492 A1* | 3/2004 | Muise et al. | 382/103 |
| 2005/0052315 A1 | 3/2005 | Winterling et al. | |
| 2007/0021879 A1 | 1/2007 | DelNero et al. | |
| 2007/0036439 A1* | 2/2007 | Chen | 382/209 |
| 2008/0189003 A1 | 8/2008 | Gillula | |
| 2009/0231183 A1 | 9/2009 | Nettleton et al. | |
| 2011/0169951 A1* | 7/2011 | Claxton et al. | 348/143 |
| 2013/0166202 A1* | 6/2013 | Bandyopadhyay et al. | 701/501 |

OTHER PUBLICATIONS

European Search Report issued on Jun. 14, 2010, for European Application No. 09252822.3.

Great Britain Search Report issued on May 5, 2010, for Great Britain Application No. 0922011.2.

Jeffrey K. Uhlmann, Covariance consistency methods for fault-tolerant distributed date fusion, Information Fusion, vol. 4, No. 4, Sep. 1, 2003, pp. 201-215.

T.J. Wren et al., Multi-Platform Multi-Target Tracking Fusion Via Covariance Intersection: Using Fuzzy Optimised Modified Kalman Filters With Measurement Noise Covariance Estimation, Apr. 15, 2008, pp. 187-194.

Matthew Ridley et al, Decentralised Ground Target Tracking with Heterogeneous Sensing Nodes on Mutiple UAVs, Lecture notes in Computer Science, Springer DE, vol. 2634, Jan. 1, 2003, pp. 545-565.

Martin E. Liggins II, et al., Distributed Fusion Architectures and Algorithms for Target Tracking, Proceedings of the IEEE, vol. 85, No. 1, Jan. 1997, pp. 95-107.

Samuel S. Blackman, Multiple-Target Tracking with Radar Application, Jan. 1, 1986, Artech house, Dedham, MA USA, pp. 19-47 (chapter 2) and pp. 357-396 (chapter 13).

Duncan Smith et al., Approaches to Multisensor Data Fusion in Target Tracking: A Survey, IEEE Transactions on Knowledge and Data Engineering, IEEE Service Center, Los Alamitos, CA USA, vol. 18, No. 12, Dec. 1, 2006, pp. 1696-1710.

Notification Concerning Transmittal of International Preliminary Report on Patentability (Forms PCT/IB/326 and PCT/IB/373) and the Written Opinion of the International Searching Authority (Form PCT/ISA/237) dated Jun. 28, 2012, issued in corresponding International Application No. PCT/GB2010/052139. (8 pages).

* cited by examiner

PRODUCING DATA DESCRIBING STATES OF A PLURALITY OF TARGETS

The present invention relates to producing data describing states of a plurality of targets using a processor in a system having at least one onboard sensor.

Modern autonomous systems, such as autonomous vehicles, tend to be fitted with more and better sensors than in the past. Improved communications technology also means that more and better information can be relayed within the autonomous system and/or exchanged with a remote operator. However, this improved communication can also mean that repeated, redundant and conflicting reports are produced about the same units with different levels of accuracy, latency and relevance.

Embodiments of the present invention are intended to address at least some of the problems outlined above.

According to a first aspect of the present invention there is provided a method of producing data describing states of a plurality of targets using a processor on a system having at least one onboard sensor, the method including:

obtaining data from at least one onboard sensor;

performing a first data fusion process on the obtained onboard sensor data to produce onboard sensor fused data;

obtaining data from at least one off-board sensor, and performing a second, different data fusion process on the obtained off-board sensor data and the onboard sensor fused data to produce target state data.

The first data fusion process may comprise an information filter algorithm.

The second data fusion process may comprise a covariance intersection algorithm.

The method may include:

performing a data association process in order to associate a track update in the data obtained from the at least one onboard sensor with a track in a fused track list, and using the first data fusion process to fuse the associated track with a track in the fused track list to produce an updated fused track list.

The method may further include (for each said onboard sensor):

performing a data association process in order to associate tracks in the updated fused track list with tracks in an overall track list, and using an intermediate data fusion process to fuse the associated tracks with tracks in the overall fused track list to produce an updated overall fused track list.

The intermediate data fusion process may comprise a covariance intersection algorithm.

The method may include (for each said off-board sensor):

performing a data association process in order to associate a track update in the data obtained from the at least one off-board sensor with a track in the overall track list, and using the second data fusion process to fuse the associated tracks with tracks in the overall fused track list to produce an updated overall fused track list containing the target state data.

The target state data may include descriptions of location and/or velocity of the targets.

According to another aspect of the present invention there is provided a system having a processor and at least one onboard sensor, the system being configured to produce data describing states of a plurality of targets and including:

a device configured to obtain data from at least one onboard sensor;

a device configured to perform a first data fusion process on the obtained onboard sensor data to produce onboard sensor fused data;

a device configured to obtain data from at least one off-board sensor, and a device configured to perform a second, different data fusion process on the obtained off-board sensor data and the onboard sensor fused data to produce target state data.

The system may include an at least partially autonomous vehicle.

According to a further aspect of the present invention there is provided a computer program configured to execute the processes described herein.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments. As such, many modifications and variations will be apparent to practitioners skilled in the art. Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

The invention may be performed in various ways, and, by way of example only, embodiments thereof will now be described, reference being made to the accompanying drawings in which.

Figure 1:
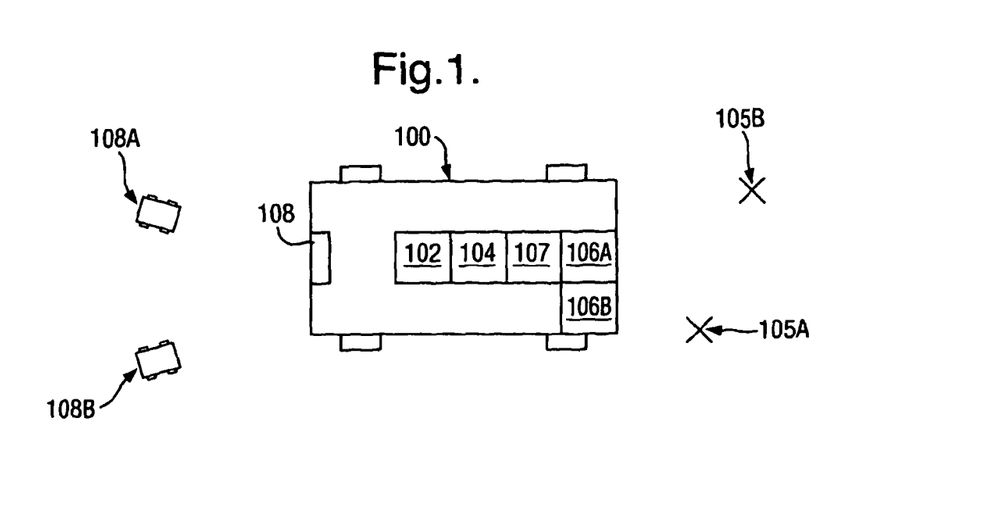
FIG. 1 is a schematic diagram of a vehicle with onboard sensors and a processor, as well as external targets.

FIG. 1 shows a vehicle 100 that is fitted with a computing device including a processor 102 and memory 104. The vehicle will also include other conventional features, e.g. steering and traction components, and may be at least partially automated and/or can include a planning system for assisting a human operator. The vehicle may be capable of travelling on/through land, air or water. The vehicle will also typically include communications devices for communicating with external systems, including other vehicles. It will be appreciated that the vehicle is only one example of a system having at least one onboard sensor that can be used to produce data describing states of a plurality of targets and in alternative embodiments the system can comprise other types of devices, such as a hand-held tracking unit, for example.

The vehicle 100 is further fitted with at least one local onboard sensor. In the example the vehicle has a first local sensor 106A and a second local sensor 106B. The local sensors are configured to take measurements relative to the vehicle, typically to obtain information regarding obstacles/objects (which may be static or moving) in the vicinity of the vehicle. Such obstacles/objects shall be called "targets" herein and examples are shown schematically at 105A and 105B, but it will be understood that a target is not necessarily something at which a weapon is to be fired. Examples of suitable local sensors include visual, infra-red, RADAR or LIDAR type devices and the sensors can produce information regarding the range and/or angle to an object in the environment, but other types of output could be produced, e.g. estimated velocity of a moving object.

The processor 102 executes code that is intended to use data received directly or indirectly from at least one of the onboard sensor and combine it with data received indirectly from at least one off-board sensor (see below) in order to produce data describing the states of at least one sensed target. Examples of onboard sensor data used by the processor are given below, but it will be understood that the type of data can vary:

Sensor number/identifier
List update time
Number of tracks
Tracks.

The track data type can include the following data, for example: Track number/identifier; Track update time; Track update class (e.g. no update, delete, 3-D track, line of sight, IFF response); Multiple target (Boolean); Manoeuvre parameter (magnitude of manoeuvre); Location; Velocity; Covariance (full location and velocity covariance matrix), and/or Environment (unknown, space, air, land, sea, subsurface).

The vehicle 100 further includes a communications interface 107 that is configured to communicate with remote devices. The remote devices take the form of two other vehicles 108A, 108B in the example, but it will be understood that the number and nature of the devices can vary. The data exchanged between the vehicle 100 and the remote devices 108 will normally include sensor-related data. Thus, the vehicle 100 can receive off-board sensor readings. If the off-board readings are not in the same format as those taken by its own sensors then the readings may be converted into a suitable format. Examples of off-board sensor data used by the processor are given below, but it will be understood that the type of data can vary:

List update time
Number of reports
Track reports

The track report data type can include, for example: Extrapolation time; Update time; Report status (none, new track, delete track); Report class (unknown, co-operator self report, 3-D track, line of sight); Co-operator (e.g. remote device/vehicle identity) number; Track Number; Update time valid (Boolean); Location valid (Boolean); Velocity valid (Boolean); Quality indicator valid (Boolean); Location; Velocity; Location quality indicator, and/or Environment (unknown, space, air, land, sea, subsurface).

Figure 2:
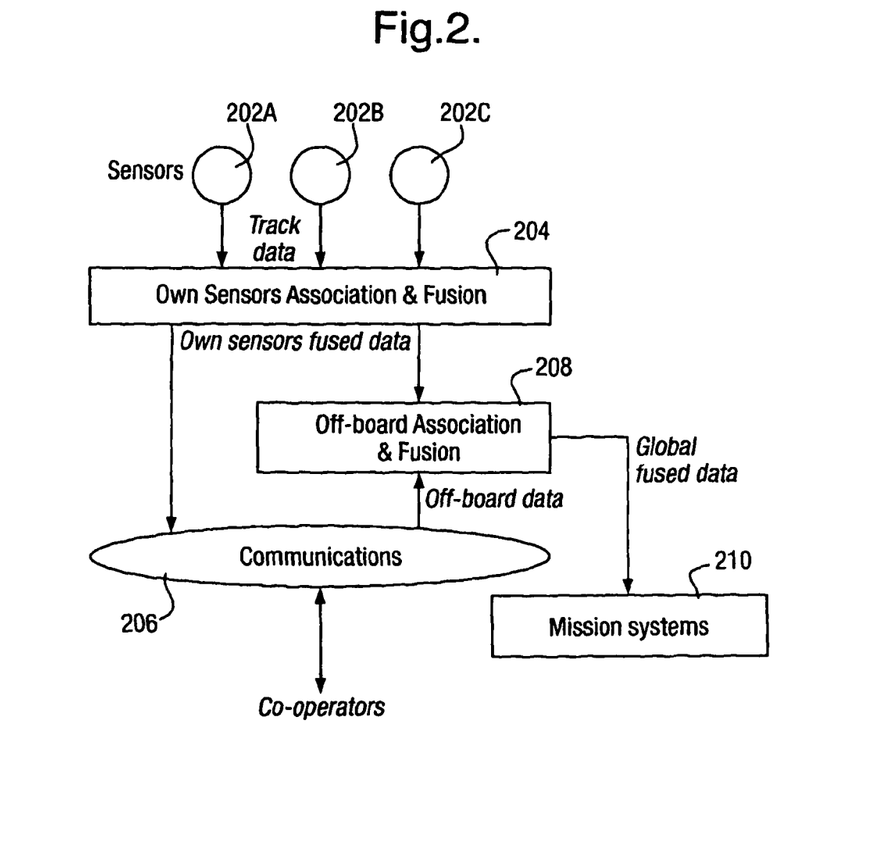
FIG. 2 is a schematic illustration of an architecture for another example system configured to produce data describing states of a plurality of targets.

FIG. 2 illustrates schematically the architecture of another example system having a set of onboard sensors 202A-202C that transfer track data to data association and data fusion processes 204 that execute on an onboard processor. The system further includes a communications interface 206 that receives track data from at least one off-board sensor. The onboard data processes 204 generate fused data that is transferred to data association and fusion processes 208 that also receive the off-board track data. The onboard fused data may also be transferred to the communications interface 206 for use by off-board processors on at least one remote device.

The data association and fusion processes 208 generate global fused data that can then be transferred to at least one onboard mission system 210 that can be used to control the vehicle, for example, based on the target state information that has been generated. For instance, the vehicle may be controlled in order to avoid the targets. Own state data from the vehicle's navigation system may also be taken into account during the data processing. Such data can include, for example: Time; Location; Velocity; Acceleration; Attitude; Attitude rates of change; Heading; Magnetic heading; Expected plan position error; Expected vertical position error; Groundspeed, and/or Track.

Figure 3:
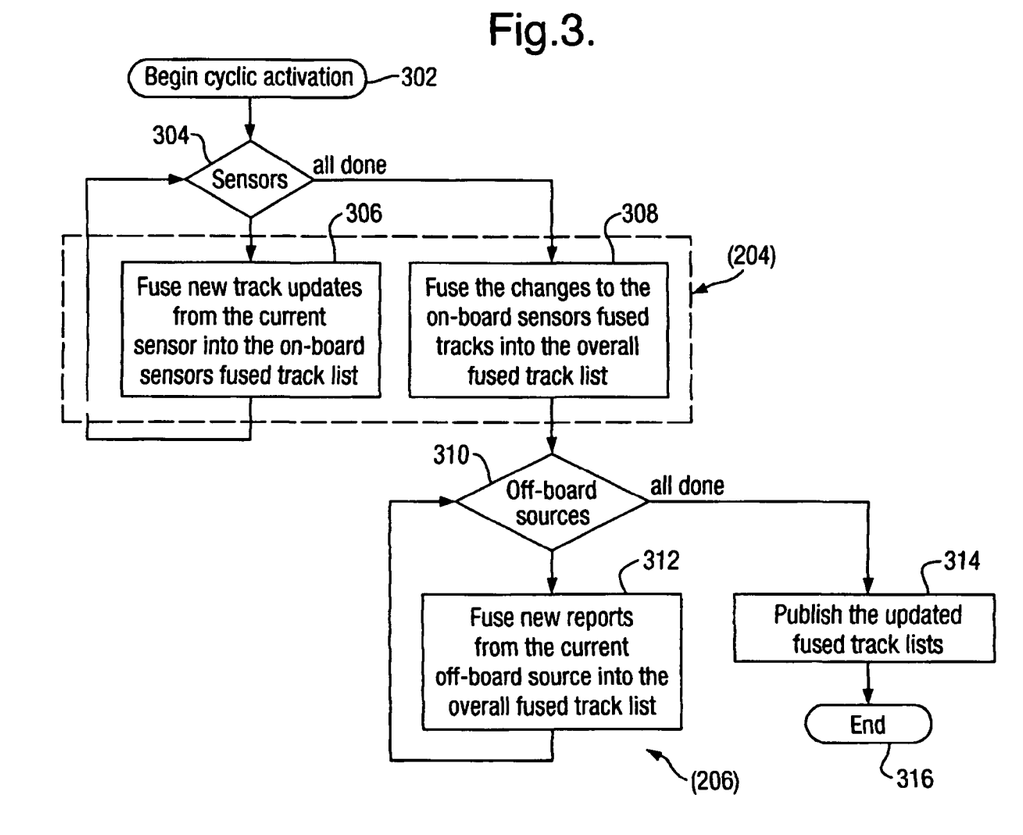
FIG. 3 is a flow chart showing at a high-level operation of the example system.

FIG. 3 shows steps performed by the onboard data association and data fusion processes 204 and the off-board data association and data fusion processes 208. At step 302 cyclic operation of the target sensing system begins. At step 304 a check is performed as to whether track data from all of the onboard sensors has been received and processed. If not then track update data from the first/next sensor is processed and at step 306 a data fusion process is performed that is aimed to fuse the track update with a track in a stored list (or any other suitable data structure) that contains tracks resulting from previous processing of the sensor's readings. The list is initially empty if the track update being processed is the first one. This data fusion process results in an updated track list for the current sensor. Once this step has been performed for all the onboard sensors (that have generated updates), control is passed to step 308.

At step 308 a data fusion process is performed in order to fuse the separate updated track lists for each of the onboard sensors with an overall fused track list that contains tracks based on data received from all of the onboard sensors. This data fusion process results in an updated overall fused track list.

Processing of track data received from off-board sensors then takes place. At step 310 a check is performed as to whether track data from all of the off-board sensors has been received and processed. If not then track update data from the first/next off-board sensor is transferred for processing by step 312. At step 312 a data fusion process is performed that is aimed to fuse the current off-board track update with a track in the overall fused track list. Once this step has been performed for all the off-board sensors (that have generated updates), control is passed to step 314, where the updated fused track list is output. The output list can be used directly by a processor, e.g. to control a vehicle, displayed to a user, and/or used in some other way. The fused data generated may include the following:

List update time
Number of tracks
Tracks;

Where each track can include, for example: Local track number; Global Track Number; Group Track Number; Track Update Time; Track Update Class (e.g. no update, delete, 3-D track, line of sight, IFF response); Multiple Target (Boolean); Manoeuvre Parameter (magnitude of manoeuvre); Location; Velocity; Environment (unknown, space, air, land, sea, subsurface), and/or Covariance (full location and velocity covariance matrix).

The cyclic operation can end at step 316.

Figure 4:
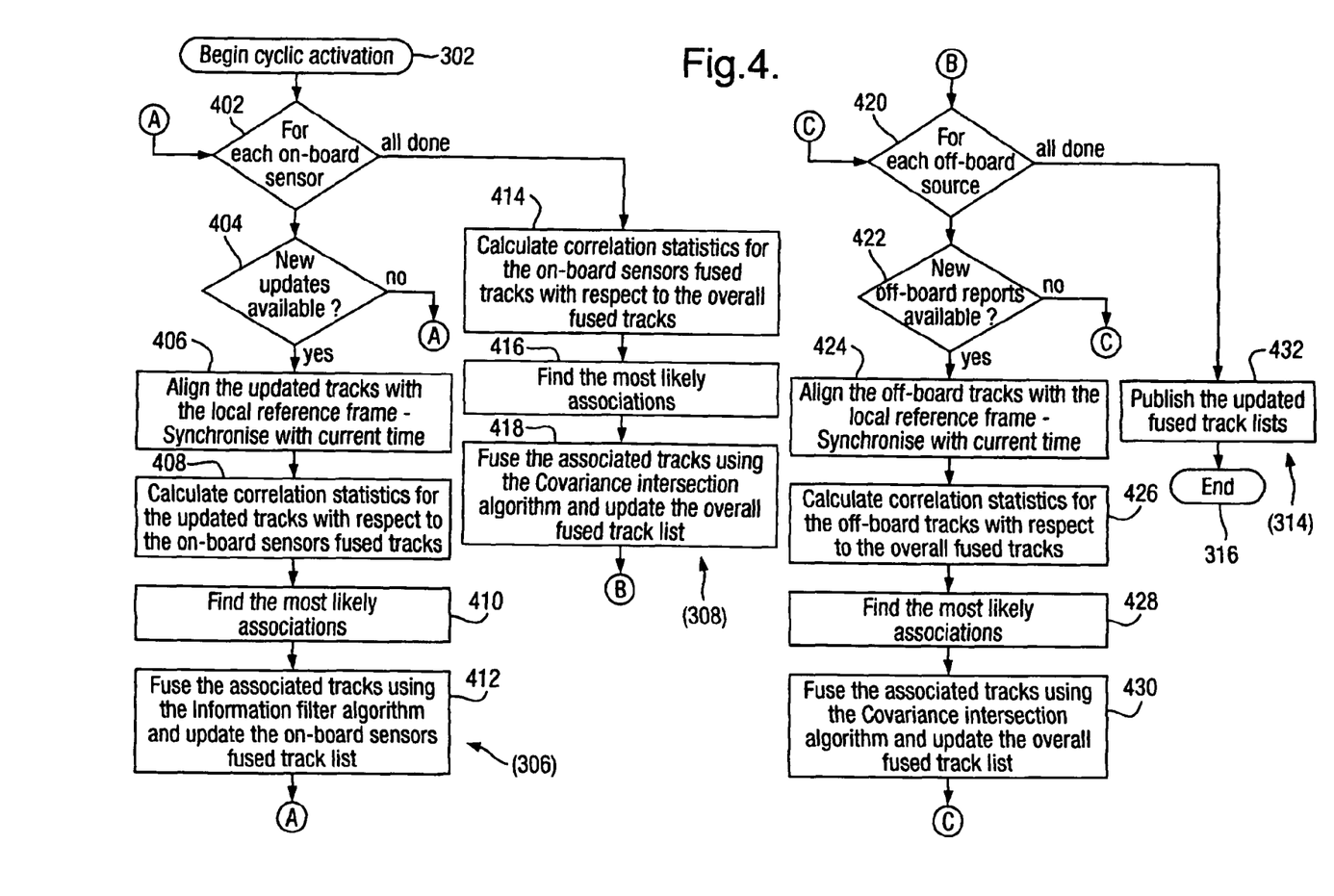
FIG. 4 is a flow chart showing the operation in more detail.

FIG. 4 shows the steps of FIG. 3 in more detail. Cyclic processing begins at step 302 and step 402 marks the start of a processing loop that is performed for each onboard sensor. The loop begins with step 404, which checks whether the current sensor being considered has any updates available. If it does not then control is passed back to step 402 and data from the next onboard sensor (if any remain) is processed. If the current sensor has updates available then at step 406 the updated tracks are aligned with the local coordinate reference frame of the vehicle/system and synchronised with the current time. At step 408 correlation statistics are calculated for the updated tracks with respect to tracks contained in a list of fused tracks for the onboard sensor currently being processed that were generated during previous iterations of the processing steps. Step 408 may involve the following considerations/computations:

The feasibility of each source track and fused track pairing is tested using statistical hypothesis tests.

Log-likelihoods are calculated for each feasible source track and fused track pairing and derived distance (probabilistic separations) values are stored in a correlation matrix.

A nominal large distance is stored for each infeasible pair.

The outcomes of the hypothesis tests are stored in the correlation matrix.

The Bayesian likelihoods of each pairing are calculated and stored in the correlation matrix and normalised to yield probabilities At step 410 the correlation statistics are used to associate the current tracks with tracks in the fused track list. The association can involve finding the "best" set of assignments using an optimal search algorithm (such as The Kuhn-Munkres Algorithm, also known as the Hungarian method, as extended by Burgeois and Lasalle to accommodate rectangular assignment matrices) to yield the most likely set of track pairs and identify singletons in both the source data (where no fused track exists) and in the fused data (where a fused track is not reported by the current source).

At step 412 a first data fusion process is used to fuse the associated tracks and update the fused track list. The first data fusion process comprises a (decentralised) information filter algorithm, which can be thought of as algebraically equivalent to a Kalman filter performing so-called plot or measurement fusion. However, in the example implementation it is partitioned in a way that allows the algorithm to be entirely self-contained within a fusion centre receiving conventionally formatted reports. For this implementation, the reports are simply $x_i$ and $P_i$—single observer tracks and their associated covariance matrices. Fusion is optimal (in the sense that a Kalman filter tracking is optimal) if the sensors communicate after every update. An example mathematical description of the algorithm shall now be given for completeness, beginning with Initialisation, where upon receipt of the very first report (comprising $x_1$ and $P_1$) from any source initialises the filter:

$$x^F_1 = x_1$$

$$P^F_1 = P_1$$

$$x = x_1$$

$$P = P_1$$

On receipt of the first report ($x_i$ and $P_i$) from any other source the fusion filter extrapolates and initialises the new source:

$$P^{-1} = \tilde{P}^{-1} + P_i^{-1}$$

$$P^{-1}x = \tilde{P}^{-1}\tilde{x} + P_i^{-1}x_i$$

$$x^F_i = x_i$$

$$P^F_i = P_i$$

Following the Initialisations, upon receipt of an updated report ($x_i$ and $P_i$) from any source the fusion filter extrapolates and fuses the new data:

$$P^{-1} = \tilde{P}^{-1} + P_i^{-1} - (\tilde{P}^F_i)^{-1}$$

$$P^{-1}x = \tilde{P}^{-1}\tilde{x} + P_i^{-1}x_i - (\tilde{P}^F_i)^{-1}\tilde{x}^F_i$$

$$x^F_i = x_i$$

$$P^F_i = P_i$$

The filter is extrapolated as follows:

$$\tilde{P}^F_i = \Phi P^F_i \Phi^T + Q \forall i$$

$$\tilde{P} = \Phi P \Phi^T + Q$$

$$\tilde{x}^F_i = \Phi x^F_i \forall i$$

$$\tilde{x} = \Phi x$$

The notation used above is as follows:

$x_i$ and $P_i$—The track state (dimension d) and covariance matrix reported by source i.

$x^F_i$ and $P^F_i$—The track state and covariance last reported by source i stored in the centralised information filter.

x and P—The fused track state and covariance matrix.

$\tilde{\alpha}$—The extrapolated value of the quantity $\alpha$.

$A^{-1}$—The inverse of the matrix A.

$\Phi$—The state transition matrix.

Q—The process noise covariance matrix.

The present inventors have discovered that it is advantageous to use the information filter algorithm (also known as an inverse covariance filter) as the first data fusion process. The information filter is an algebraic manipulation of the Kalman filter that leads to a fusion algorithm with the full performance of the Kalman filter that can be implemented in ways that place fewer constraints on the data fusion system architecture. The Kalman filter is an efficient recursive filter that estimates the state of a linear dynamic system from a series of noisy measurements. In the example, the dynamic system can be an aircraft in flight or a vehicle moving on the ground and the noisy measurements are observations from multiple sensors. If the data fusion system architecture could be constructed so that all relevant sensor observations were independent, linear and arrived at the fusion centre without delay or impediment, the Kalman filter would be the ideal fusion algorithm. Unfortunately, for practical reasons, the data fusion system architecture cannot be constructed in this way. The information filter is exploited in the present example to allow the architecture to be partitioned so that individual sensor trackers for individual onboard sensors communicate tracks to the fusion centre. The Information filter data fusion algorithm gives optimal fusion performance for the onboard sensors' data.

Once all of the onboard sensors have been processed, control passes from step 402 to step 414. At step 414 correlation statistics are calculated for the onboard sensors fused tracks with respect to tracks contained in an overall list of fused tracks for the all of the onboard and off-board sensors generated during previous iterations of the processing steps. Then, at step 416, the correlation statistics are used to associate the current tracks with tracks in the overall fused track list. At step 418 an intermediate data fusion process is used to fuse the associated tracks and update the overall fused track list. The intermediate data fusion process may comprise a covariance intersection algorithm.

Step 420 marks the start of a processing loop that is performed for each off-board sensor. The loop begins with step 422, which checks whether the current off-board sensor being considered has any new updates available. If it does not then control is passed back to step 420 and data from the next off-board sensor (if any remain) is processed. If the current sensor has updates available then at step 424 the updated tracks are aligned with the local coordinate reference frame of the vehicle/system and synchronised with the current time. At step 426 correlation statistics are calculated for the updated tracks with respect to tracks contained in the overall fused track list. At step 428 the correlation statistics are used to associate the current tracks with tracks in the fused track list. At step 430 a further data fusion process is used to fuse the associated tracks and update the overall fused track list. This further data fusion process comprises a covariance intersection algorithm. The covariance intersection algorithm combines two or more estimates of state variables in a Kalman filter when the correlation between them is unknown. Correlation between tracks can arise when separate trackers observe the same track manoeuvres over extended time or when tracks are formed from data sets with common components; neither condition can be ruled out in off-board data and covariance intersection ensures convergent fusion of these data.

The present inventors have discovered that it is advantageous to use the covariance intersection process in this way because it offers robust fusion of the off-board data. Using the Information filter on the off-board data would risk divergent fusion estimates and a misleading fused picture. The inventors have realised that both algorithms are needed to maximise the performance of the data fusion process and the best practical way to combine them is to fuse all the data from the onboard sensors using the Information filter algorithm and then fuse the results with the off-board sensors data using the Covariance Intersection algorithm.

A robust information filter guarantees that provided the source data is "finite sample consistent" (unbiased with a covariance matrix that truly reflects the errors) or "conservative" (having a covariance matrix that encloses the errors) the fused data produced by the algorithm will be "conservative" even if the uncertainties in the sources are correlated and even if the same data is reported repeatedly or by multiple sources. This guarantee follows from the fact that N×P bounds the uncertainty in x (which can be proved mathematically). When the source data obeys approximately linear relationships and has approximately Gaussian distributed errors, the Covariance Intersection algorithm can outperform the robust information filter algorithm and offer the same robust estimation guarantee. However, when the linear/Gaussian approximations are poor the modified Covariance Intersection algorithm below retains its robustness guarantee longer:

At Initialisation of the algorithm, on receipt of the very first report from any source initialise the filter:

$$x^F_1 = x_1$$

$$P^F_1 = P_1$$

$$x = x_1$$

$$P = P_1$$

When a new update is received for source i, the filter extrapolates. Then:

$$x^F_i = x_i$$

$$P^F_i = P_i$$

$$x = x_i$$

$$P = P_i$$

For each source $j \neq i$:
Test for intersection of the contours of equal likelihood described by P and $\tilde{P}^F_j$.
If an intersection exists:

$$P^{-1} = P^{-1} + (\tilde{P}^F_j)^{-1}$$

$$P^{-1}x = P^{-1}x + (\tilde{P}^F_j)^{-1}\tilde{x}^F_j$$

Else if the contour for $P_j$ is fully enclosed by the contour for P, then:

$$x = \tilde{x}^F_j$$

$$P = \tilde{P}^F_j$$

Else if the contour for P is fully enclosed by the contour for $\tilde{P}^F_j$, then do nothing.

When each source $j \neq i$, has been considered P=N×P where N is the number of sources.

The filter is extrapolated as follows:

$$\tilde{P}^F_i = \Phi P^F_i \Phi^T + Q \forall i$$

$$\tilde{x}^F_i = \Phi x^F_i \forall i$$

The notation used above is as follows:
$x_i$ and $P_i$—The track state (dimension d) and covariance matrix reported by source i.
$x^F_i$ and $P^F_i$—The track state and covariance last reported by source i stored in the centralised information filter.
x and P—The fused track state and covariance matrix.
$\tilde{\alpha}$—The extrapolated value of the quantity $\alpha$.
$A^{-1}$—The inverse of the matrix A.
$\Phi$—The state transition matrix.
Q—The process noise covariance matrix.

Once all of the off-board sensors have been processed, control passes from step 420 to step 432, which corresponds to step 314 described above.

For completeness, mathematical descriptions of the example algorithms discussed above will now be given.

In the Bayesian Assignment Algorithm used during the data association processes $\Theta_i$ is considered to be a feasible hypothesis that could explain the mapping between the sensor tracks Y and the real world targets X. A way of selecting the best hypothesis $\Theta$ is required. Suppose the fused track list that results from the hypothesis $\Theta_i$, is denoted $\hat{X}_i$, then the most likely track list, given the observed data, can be said to identify the most likely data association hypothesis: $\Theta = \arg\max_{\forall i} P(\hat{X}_i|Y, \Theta_i)$ However, to calculate all the possible track lists and their likelihoods can be impractical when the numbers of sources and tracks is large.

The distance-square of an individual feasible track pair, jk is denoted as:

$$D_{jk}^2 = -2 \times \ln[P(jk|Y)] + a \quad (1)$$

Where a is constant. Then:

$$\operatorname*{argmin}_{\forall i} \sum_{jk \in \Theta_i} D_{jk}^2 \equiv \operatorname*{argmax}_{\forall i} \prod_{jk \in \Theta_i} P(jk|Y) \equiv \operatorname*{argmax}_{\forall i} P(\hat{X}_i|Y, \Theta_i)$$

The minimum sum of distance-squares coincides with the most likely data association hypothesis. So, an association matrix of distance-squares is created and solved using an optimal search algorithm such as Munkres. First, it is required to formulate the distance-square. Bayes rule gives the probability of a track pair belonging to the same real-world target, given the observations:

$$P(jk|Y) = \frac{P(Y|jk)P(jk)}{P(Y)}$$

Then, in its simplest form, for full rank tracks defined with respect to a common axis set with independent multivariate Gaussian (mvG) distributed errors:

$$D_{jk}^2(t) = (x_j - x_k)^T (P_j + P_k)^{-1} (x_j - x_k) + \ln|P_j + P_k| - 2\ln\{P(jk)\} \quad (2)$$

Where x is the track state and P is its variance/covariance matrix; both extrapolated up to the time of assessment. Using the recursive Bayesian argument;

$$P(jk) \triangleq P(jk|Y)\big|_{t-1} \propto \exp\left(-\frac{D_{jk}^2(t-1)}{2}\right)$$

P(Y) may be included along with other constant terms in constant a of equation (1); and a may be discarded because it will not affect the location of the minimum.

P(Y|jk) can be expanded to include probabilities of acquisition and, when both tracks have undergone some kind of classification, the log likelihood of classification match may be included, $-2 \ln \{c_j \cdot c_k\}$ where c is the class likelihood vector.

The algorithm is adapted when it is used to associate source tracks with central tracks because independence is not assured. This may be dealt with by calculating sub-fused tracks comprising all data from sensors and sources apart from the one providing the current track update. The new updates and the sub-fused tracks are then more likely to be free of correlations arising from double use of the same source data.

A Bayesian Assignment Algorithm can be used during the data association processes and is useful for association of precisely characterised data (with due allowance for registration errors), provided the sensor resolution is good in relation to target separation, convergence to stable data associations with high confidence can be expected. When data is imprecise and/or the sensor resolution is poor in relation to the target separation, convergence and stability of assignment will not occur. Joint probabilistic association can offer a viable alternative. Instead of assigning track pairs, the probabilities that a new track update originated from each of the known fused tracks are calculated and the probability that the update originated from a previously unknown target. Groups of source tracks are formed within which the probability of association with a particular fused track exceeds some threshold. The likelihood of each possible association is calculated:

$$Li(jk|Y) = \exp\left(-\frac{D_{jk}^2(t)}{2}\right)$$

Where $D_{jk}^2(t)$ is calculated using equation (2) or some more complex version of it. The joint probability of jk over all the input tracks and all the fused tracks is approximated:

$$Pr(jk|Y) \approx \frac{Li(jk|Y)}{\sum_{\forall j} Li(jk|Y) + \sum_{\forall k} Li(jk|Y) - Li(jk|Y)}$$

The probability that the update j is a previously unknown target is estimated:

$$Pr(\text{new track } j|Y) \approx 1 - \sum_{\forall k} Pr(jk|Y)$$

When data is associated by the Bayesian Assignment Algorithm, fusion of track pairs is as follows:

$$x_F(jk) = F(x_j, x_k)|_{\forall jk \in \Theta}$$

Where F( . . . ) represents a fusion operation. When no assigned track exists in Θ for the update j:

$$x_F(j) = x_j$$

When no assigned update exists in Θ for the track k:

$$x_F(k) = x_k$$

When data is associated by the Bayesian Assignment Algorithm, fusion of track pairs using Joint Probabilistic Association and Fusion is as follows:

$$x_F(k) = \sum_{\forall j} \lfloor Pr(jk|Y) F(x_j, x_k) \rfloor$$

When the probability that the update j is a previously unknown target exceeds some threshold:

$$x_F(j) = x_j$$

The invention is applicable to autonomous air, land and sea vehicles.

The invention claimed is:

1. A method of producing data describing states of a plurality of targets using a processor in a system having at least one onboard sensor, the method comprising:
    obtaining data from at least one onboard sensor;
    performing a first data fusion process on the obtained onboard sensor data to produce onboard sensor fused data, said first data fusion process being performed using a first fusion algorithm;
    obtaining data from at least one off-board sensor; and
    performing a second, different data fusion process on the obtained off-board sensor data and the onboard sensor fused data to produce target state data, said second fusion process being performed using a second fusion algorithm that is different from the first fusion algorithm.

2. A method according to claim 1, wherein the first data fusion process comprises:
    an information filter algorithm.

3. A method according to claim 1, wherein the second data fusion process comprises:
    a covariance intersection algorithm.

4. A method according to claim 1, comprising:
    performing a data association process in order to associate a track update in the data obtained from the at least one onboard sensor with a track in a fused track list; and
    using the first data fusion process to fuse the associated track with a track in the fused track list to produce an updated fused track list.

5. A method according to claim 4, comprising:
    a) performing a data association process in order to associate tracks in the updated fused track list with tracks in an overall track list; and b) using an intermediate data fusion process to fuse the associated tracks with tracks in the overall fused track list to produce an updated overall fused track list.

6. A method according to claim 5, wherein the steps a) and b) are performed for data received from each of the onboard sensors.

7. A method according to claim 5, wherein the intermediate data fusion process comprises:
   a covariance intersection algorithm.

8. A method according to claim 5, comprising:
   i) performing a data association process in order to associate a track update in the data obtained from the at least one off-board sensor with a track in the overall track list; and
   ii) using the second data fusion process to fuse the associated tracks with tracks in the overall fused track list to produce an updated overall fused track list containing the target state data.

9. A method according to claim 8, wherein the steps i) and ii) are performed for data received from each of the off-board sensors.

10. A method according to claim 1, wherein the target state data comprises:
    descriptions of location and/or velocity of targets.

11. A computer program, stored in a non-transitory medium, and configured to execute a method of producing data describing states of a plurality of targets using a processor in a system having at least one onboard sensor, the method comprising:
    obtaining data from at least one onboard sensor;
    performing a first data fusion process on the obtained onboard sensor data to produce onboard sensor fused data, said first data fusion process being performed using a first fusion algorithm;
    obtaining data from at least one off-board sensor; and
    performing a second, different data fusion process on the obtained off-board sensor data and the onboard sensor fused data to produce target state data, said second fusion process being performed using a second fusion algorithm that is different from the first fusion algorithm.

12. The non-transitory medium according to claim 11, wherein the first data fusion process comprises:
    an information filter algorithm.

13. The non-transitory medium according to claim 11, wherein the second data fusion process comprises:
    a covariance intersection algorithm.

14. The non-transitory medium according to claim 11, comprising:
    performing a data association process in order to associate a track update in the data obtained from the at least one onboard sensor with a track in a fused track list; and
    using the first data fusion process to fuse the associated track with a track in the fused track list to produce an updated fused track list.

15. The non-transitory medium according to claim 14, comprising:
    a) performing a data association process in order to associate tracks in the updated fused track list with tracks in an overall track list; and
    b) using an intermediate data fusion process to fuse the associated tracks with tracks in the overall fused track list to produce an updated overall fused track list.

16. The non-transitory medium according to claim 15, wherein the steps a) and b) are performed for data received from each of the onboard sensors.

17. The non-transitory medium according to claim 15, wherein the intermediate data fusion process comprises:
    a covariance intersection algorithm.

18. The non-transitory medium according to claim 15, comprising:
    i) performing a data association process in order to associate a track update in the data obtained from the at least one off-board sensor with a track in the overall track list; and
    ii) using the second data fusion process to fuse the associated tracks with tracks in the overall fused track list to produce an updated overall fused track list containing the target state data.

19. A system configured to produce data describing states of a plurality of targets, the system comprising:
    a processor;
    at least one onboard sensor;
    a device configured to obtain data from the at least one onboard sensor;
    a device configured to perform a first data fusion process on the obtained onboard sensor data to produce onboard sensor fused data, said first data fusion process being performed using a first fusion algorithm;
    a device configured to obtain data from at least one off-board sensor; and
    a device configured to perform a second, different data fusion process on the obtained off-board sensor data and the onboard sensor fused data to produce target state data, said second fusion process being performed using a second fusion algorithm that is different from the first fusion algorithm.

20. A system according to claim 19, comprising, in combination, an at least partially autonomous vehicle.

* * * * *